March 20, 1962 TADAHIKO NAKAGIRI 3,026,506
SYSTEM FOR INDICATING THE DIMENSIONS OF A PRODUCT
Filed March 9, 1960 2 Sheets-Sheet 1

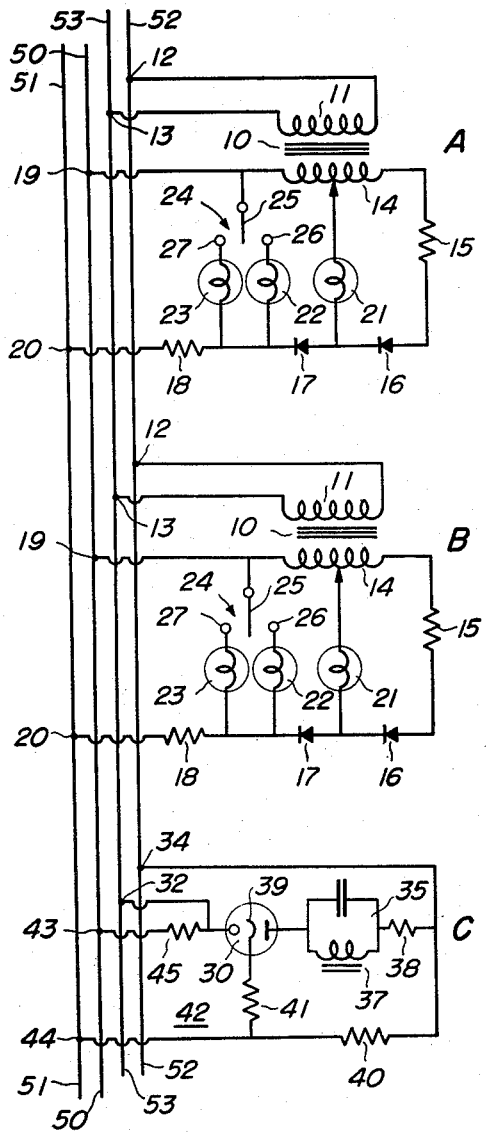
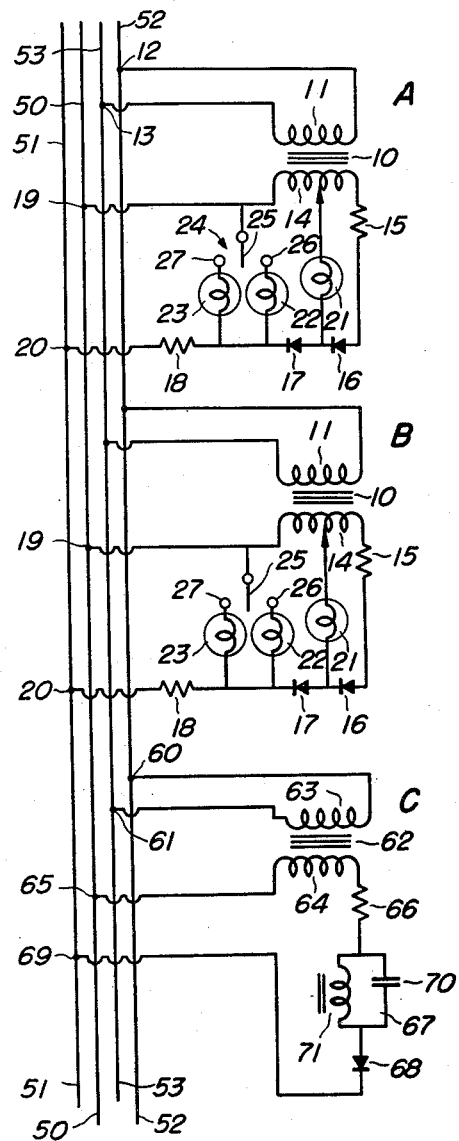

United States Patent Office
3,026,506
Patented Mar. 20, 1962

3,026,506
SYSTEM FOR INDICATING THE DIMENSIONS OF A PRODUCT
Tadahiko Nakagiri, Tokyo, Japan, assignor to Citizen Watch Co., Ltd., Tokyo, Japan, a corporation of Japan
Filed Mar. 9, 1960, Ser. No. 13,912
Claims priority, application Japan Oct. 24, 1959
5 Claims. (Cl. 340—265)

The present invention relates to an indicating system for measuring dimensions of products and obtaining visible indications whether the dimensions of the products are within a predetermined tolerance or not. In this system, when the product has many measuring points, each measuring point is measured individually and the results of measurements are indicated by lamps individually corresponding to respective measuring points, and it is collectively decided whether or not respective dimensions of all measuring points lay within the standard range, and then, in accordance with the results of measurement, the indicating apparatus operates relay-circuits for controlling other apparatus or machines.

Dial gauges or the likes, called "Signal Indicators," of a high sensitivity provided with electric contacts have heretofore been used for detecting the differences between the dimensions of the articles and the standard value of the dimensions. Such gauges generally have one movable contact and two stationary contacts and the movable contact engages one stationary contact when the dimension is of under size to the lower limit, and the movable contact engages the other stationary contact when the dimension is of over size to the upper limit. When the dimension is within the allowance, the movable contact takes the neutral position where the movable contact does not engage any of the two stationary contacts. This prior system comprises two relays for one dial gauge to operate the indicating lamp.

An object of the present invention is to provide an indicating system in which three indicating lamps are used instead of using the usual relays. Such three lamps indicate individually three status of the articles under measurement, one status being of over size, the second being of acceptable and the third being of under size.

Another object of the present invention is to provide a control circuit for multi-dimensional measurement system in which a number of indicating circuits of rectifier-type are combined together, the indicating circuits being respectively controlled by indicators corresponding to the measuring points of a product, and in which an overall indicating circuit giving indication of the existence or absence of the error in the measuring points is combined with the above individual indicating circuits.

A further object of the present invention is to provide a control circuit for a multi-dimensional measurement system in which a number of combined indicating unit circuits of rectifier type are controlled individually by signal indicators corresponding to the measuring points, and a gas-tube circuit or a vacuum-tube circuit is combined with the indicating circuits, said gas-tube circuit or vacuum circuit having a relay which is operated in accordance with the existence or absence of at least one error in the dimension.

A still further object of the present invention is to provide a control circuit for a multi-dimensional measurement in which a number of indicating circuits of rectifier type actuated individually by a plurality of signal indicators corresponding to the measuring points are combined together and a rectifying circuit is combined with the above indicating circuits, said rectifying circuit having a relay which is operated in accordance with the existence or absence of at least one error in the dimension.

These and other objects, features and advantages of the present invention will be better understood from the following detailed description of preferred embodiments of the invention, when taken in conjunction with the accompanying drawings, in which:

FIGURE 3 is a circuit diagram showing an overall inspecting system, in which a plurality of unit indicating circuits shown in FIG. 1 are connected in parallel to each other and combined with an overall indicating circuit shown in FIG. 2;

FIGURE 5 is a circuit diagram showing an overall inspecting system in which a plurality of unit indicating circuits shown in FIG. 1 are connected in parallel to each other and combined with the overall indicating circuit shown in FIG. 4;

Figure 1:
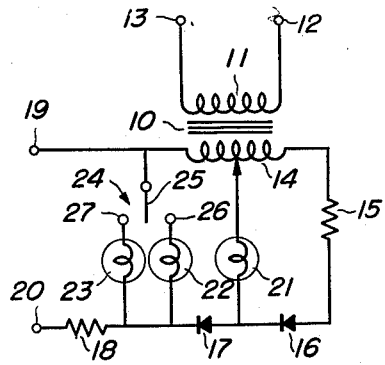
FIGURE 1 is a circuit diagram showing an indicating system according to the present invention, in which three lamps are switched by use of two contacts.

Referring to the drawings, particularly to FIG. 1, there is shown a unit circuit having two contacts and three indicating lamps which includes a transformer 10 having its primary winding 11 connected with power supply terminals 12 and 13. A resistance 15, two rectifiers 16 and 17, and a second resistance 18 is connected in series with the secondary winding 14 of the transformer 10.

An indicating means such as a pilot lamp 21 is connected to a middle point of the secondary winding 14 of the transformer 10 and to a point intermediate said rectifiers 16 and 17. Two indicating means such as pilot lamps 22 and 23 are connected in parallel relation to a point intermediate the second rectifier 17 and the resistance 18 and to one of the output terminals 19, which is connected direct to one end of the secondary winding 14, through the intermediary of a switching means 24 of the indicator.

When any product is detected to have at least one dimension exceeding the specified value, the movable contact 25 is brought into contact, for example, with the stationary contact 26, completing a circuit comprising the resistor 15, the rectifiers 16 and 17, the lamp 22, the stationary contact 26 and the movable contact 25 thus to energize the indicating lamp 22 to inform the operator or inspector that the product inspected is inferior. On this occasion, the indicating lamp 21 is not energized as it is arranged so that the current flow passing through the resistor 15, the rectifier 16 and the indicating lamp 21 is in the direction opposite to that of a current flow passing through the indicating lamp 21, the rectifier 17 and the indicating lamp 22. The secondary voltage of the transformer 10 is divided into two voltages for a resistor 15 and for the lamp 22 of the same phase and these two voltages are in a balancing condition. Accordingly, the indicating lamp 21 receives substantially no voltage from the transformer 10. Therefore, the indicating lamp 21 is de-energized when the circuit including the indicating lamp 22 is established.

In the case of this rectifying unit circuit, in which no relay is used for switching the three lamps with the two contacts, and which circuit is used itself alone, the rectifiers 16 and 17 and the resistor 18 are not needed. In case these unit circuits are combined together for overall detecting, the rectifiers 16 and 17 and the resistor 18 are needed for preventing mutual influences. The resistor 18 of the unit indicating circuit is provided for preventing influences due to the switching actions of the switch 24 in other unit indicating circuit connected in parallel thereto through the terminals 19 and 20. Therefore, the value of resistor 18 must be higher than the resistance of the lamps 21, 22 and 23.

The rectifier 17 is provided for preventing current from flowing from the terminal 20 to the terminal 19 to operate the overall indicating circuit by the switch 24 in any of the signal indicator, which circuit is connected in parallel with the terminals 19 and 20. This prevention effect is due to the back resistance of the rectifier 17. The rectifier 16 is provided as means for deenergizing the lamp 21 by obtaining a voltage across the resistor 15, which voltage is equal to the voltage occurring across the lamp 22 or 23 and is the same phase as that of the latter voltage.

There rectifiers 16 and 17 and the resistance 18 may be connected in any position of the signal indicating unit circuit in FIG. 1 as long as the above operations are obtained. The rectifiers 16 and 17 may be substituted by bridge-type rectifiers.

Figure 2:
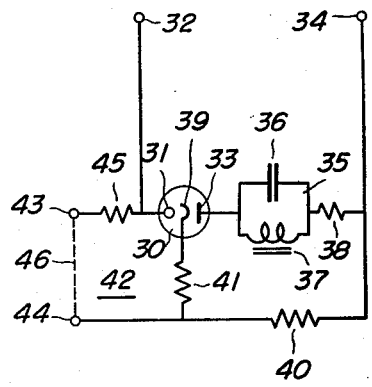
FIGURE 2 is a circuit diagram showing an overall indicating system used for the present invention.

An overall indicating circuit is shown in FIG. 2, operating a relay by utilizing discharge tube, the cathode 31 of this tube being connected with one of power supply terminals 32 while the anode 33 is connected with the other power terminal 34, forming a main discharge line. An operating circuit 35 is also connected in series relation in this line.

The operating means 35 comprises a smoothing condenser 36 and an electromagnetic type relay 37 connected in parallel relation with each other with a resistor 38 interposed in series between this operating means 35 and the terminal 34.

The discharge tube 30 includes a starting cathode 39 which is supplied with a starting voltage from one of the supply terminals 34 through resistors 40 and 41 which form a starting voltage supplying circuit. A potential dividing circuit 42 is provided relative to the starting voltage supplying circuit to make the discharge tube nonconductive, and has two terminals 43 and 44, one of which 43 is connected through a resistor 45 to the cathode 31 and the other of which 44 is connected through said resistor 40 to one of the power supply terminals 34.

In the circuit shown in FIGURE 2, the terminals 43 and 44 are short-circuited by a line 46 so that the impedance of the starting voltage supplying circuit including the resistors 40 and 45 makes the discharge tube 30 nonconductive by the impedance of the potential dividing circuit 42 whenever the impedance between terminals 43 and 44 is dependant only upon the resistor 18, that is, whenever the indicating lamp 21 is in its "on" state.

Referring to FIGURE 3, there is shown a combined circuitry comprising a plurality of unit circuits each as shown in FIGURE 1 and an overall inspecting circuit shown in FIGURE 2. The plurality, two in the illustration, of unit circuits or indicating circuits A and B are connected in parallel relation to each other and to the overall inspecting circuit.

In FIGURE 3, the unit circuits A and B are indicating circuits while the circuit C forms an overall inspecting circuit as shown in FIGURE 2. The respective terminals 19 and 20 of the circuits A and B are connected in parallel relation to lines 50 and 51, to which are also connected the terminals 43 and 44 of the potential dividing circuit 42 in parallel with the circuits A and B. These circuits A, B and C are connected with an alternating-current source through the input terminals 12—13, 12—13 and 32—34, respectively, of the circuits. The embodiment shown in FIGURE 3 is adapted to make inspection for two items at the same time, and the number of the indicating circuits in this embodiment may be increased as required to enable inspection for an additional item or items.

The unit circuit A is intended for example for inspection of block products for their height while the unit product B is intended for inspection for their width. It will be understood that it is arranged so that a line of products pass inspecting stations, not shown, in succession and the results of inspection are indicated by the unit circuits A and B, which are associated with the respective inspecting stations. As long as the product being inspected is within limits specified with respect to its height and width, the switching means 24 in the respective unit circuits do not operate, remaining in the position shown in FIGURE 3. Under these circumstances, during the positive half-cycle periods, the impedance between terminals 43 and 44 of the balanced potential dividing circuit 42 connected with the discharge tube 30 is of an extremely high value determined by the resistance of the rectifiers 17 in the unit circuits A and B to reverse current so that a sufficient starting voltage is supplied to the starting electrode 29 of the tube 30 to make the latter conductive, as described hereinbefore. As a result, a discharge current flows through the terminals 32 and 34 connected to the supply lines 53 and 52, respectively, to operate the electromagnetic relay 37 which in turn acts to operate an appropriate overall indicating device to indicate that the results of the multi-dimensional measurement of the product are all satisfactory or the product is acceptable.

During the time when the overall inspecting circuit is operating at the negative half-cycle, even if the movable contact 25 does not contact either of the stationary contacts 26 or 27, an impedance between the terminals 43 and 44 will become lower, but as the anode of the discharge tube is negative to the cathode, the discharge tube is maintained in a non-conductive condition. Accordingly, the relay is always operated only by a rectified voltage having the particular direction.

If, in the multi-dimensional inspection described above, any particular product be found short of the standard specified in height or width; for example, if the inspecting station associated with the unit circuit A has detected a shortage in height of a product, the movable contact 25 is brought into contact for example with the stationary contact 26, and the indicating lamp 22 is energized. The rectifier 17 is short-circuited by the energization of the lamp circuit to reduce the impedance of the circuit C between terminals 43 and 44. As a consequence, the voltage on the starting cathode 39 of the discharge tube 30 disappears to make the discharge tube 30 inconductive thereby to stop current supply to the electromagnetic relay 37 to deenergize the latter. The deenergized state of the relay 37 is utilized in the overall indicating device to indicate that the particular product falls short of the standard or is rejected. It will be understood that along with the above overall indication the relay 37 is utilized for controlling other instruments or apparatus.

Figure 4:
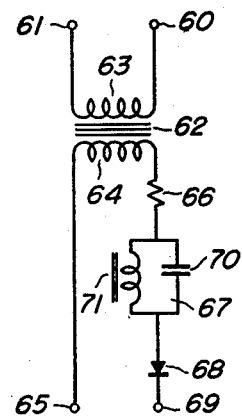
FIGURE 4 is a circuit diagram showing an overall indicating system of another type having a relay and a rectifier.

In FIGURE 4, the primary winding 63 of a transformer 62 is connected at terminals 60 and 61 with alternating-current supply lines. One extremity of the secondary winding 64 of the transformer 62 is connected with a terminal 65, and the other extremity is connected with another terminal 69 through a resistor 66, a circuit 67 and a rectifier connected in series. The circuit 67 is comprised of a smoothing condenser 70 and an electromagnetic relay 71 connected in parallel relation with the condenser 70.

Referring to FIGURE 5, unit circuits A and B are identical with those shown in FIGURE 1 and thus like component elements carry like reference numerals in these figures. The structure and operation of the unit circuits A and B, described in detail hereinbefore, will be described briefly only in connection with the unit circuit of FIGURE 4.

In the multi-dimensional measurement, as long as the product is found acceptable with all the results of inspection thereof falling within the limits specified, the unit circuits A and B are both in a state in which the indicating lamp 21 is energized as shown in FIGURE 5. In this case, a half-wave current formed by the rectifier 68 from an alternating current induced in the secondary winding 64 of the transformer 62 in the driving circuit is blocked by a rectifier 17 arranged in either of unit circuits A and B in opposite to the rectifier 68. Therefore, in this case, the relay 71 is not supplied with any current to operate it. On the other hand, in case where any one of dimensions of a product is found short of the standard specified in the multi-dimensional measurement, that unit circuit, say, A which is associated with the measurement of the dimension will operate so as to cause either of the indicating lamps 22 and 23, as the case may be, to be energized through the operation of the switch 24 in the circuit A in accordance to the result of inspection. In this case, as described hereinbefore, the reverse resistance of the rectifier 17 is short-circuited by the lamp circuit, allowing the half-wave current formed by the rectifier 68 from the current induced in the secondary winding 64 of the circuit D to flow through the resistor 66, the operating circuit 67, the rectifier 68, the terminals 69 and 20, the resistor 18, the lamp 22 or 23, the switch 24 and the terminal 19 to the terminal 65 of the circuit D, thereby causing the electromagnet relay 71 in the circuit 67 to operate. The operating voltages for the secondary winding 64 is made higher than that of the secondary winding 14 in the unit circuits A and B, so that the operations of the relay are not affected by the voltages occurring between the terminals 19 and 20 of the unit circuit. The operation of the relay 71 may be utilized to perform overall indication of the inspection result and a further operation, as described hereinbefore.

Figure 6:
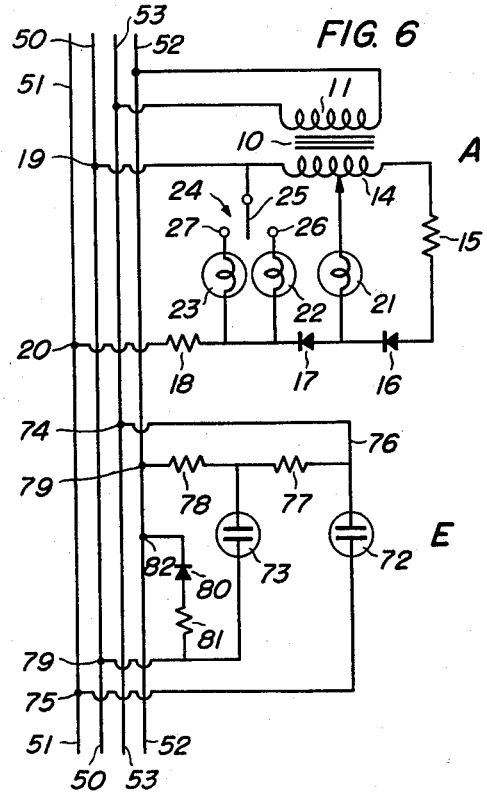
FIGURE 6 is a circuit diagram showing another overall inspecting system having neon tubes and a rectifier.

Referring to FIGURE 6, there is shown a circuit E designed for the same general purpose as the circuits shown in FIGURES 2 and 4. Only the circuit E is adapted solely to provide overall indication, but does not effect control of other circuits. In this example, two neon discharge lamps 72 and 73 are employed. The neon discharge lamp 73 is in its deenergized state as long as the product being inspected has all dimensions up to the standard, while the lamp 72 is arranged in the circuit so as to remain energized during the same period of time meanwhile, when any product falling short of the standard is detected, the unit circuit A or B described above operates accordingly to deenergize the neon discharge lamp 73 while energizing the other neon discharge lamp 72. Further description will now be made with respect to the circuit of this embodiment.

One of the electrodes of the neon discharge lamp 72 is connected through a conductor 76 with one of power supply terminals 74. The line 76 is also connected through resistors 77 and 78 with the other power supply terminal 79. The terminal 74 is connected with the line 53 described above while the terminal 79 is connected with line 52. One electrode of the other neon discharge lamp 73 is connected to a point intermediate said resistors 77 and 78 while the other electrode is connected with the line 50 at a terminal 83. Said other electrode of the lamp 73 is also connected through a resistor 81 and a rectifier 80 to the supply line 52 at a terminal 82 as shown.

This unit circuit E is connected in combination with the unit circuit A or B. The unit circuit A or B is as described hereinbefore and will not require any further description. In FIGURE 6, only the circuit A is shown as a circuit connected in combination, but it will be understood that a plurality of such circuits may be provided for the purpose of multi-dimensional inspection. The circuit of FIGURE 6 is shown in a state indicating that the product comes up to the standard in all its dimensions with an indicating lamp 21 energized and lamps 22 and 23 deenergized. In this state, as regards the unit circuit E, a circuit $a$ is assumed to exist comprising the supply terminal 74, the line 76, the neon discharge lamp 72, the terminal 20, the resistor 18, the rectifier 17, the secondary winding 14 of the transformer 10, the terminal 19, the terminal 79, the resistor 81, the rectifier 80, and the supply terminal 82. In this assumed circuit, however, actually no current flows because of the reverse resistance of the rectifier 17 of the unit circuit A. As a result, the lamp 72 is in its deenergized state. Also there occurs in this assumed circuit $a$ no half-wave current in an opposite direction due to the reverse resistance of the rectifier 80. Thus, in the state shown in FIGURE 6, no voltage is provided across the terminals of the lamp 72 to energize it. Also in the state of FIGURE 6, a circuit $b$ may be assumed which comprises the supply terminal 79, the resistor 78, the neon discharge lamp 73, the resistor 81, the rectifier 80 and the power supply terminal 82. In this circuit actually flows a half-wave current through the rectifier 80 with the power supply voltage divided by a potential dividing resistance 78 applied on said lamp 73 to keep it energized.

Where any product falling short of the standard is detected, the unit circuit A operates to actuate the switch 24 to energize either the indicating lamp 22 or 23. On this occasion, a half-wave current flows in the above described circuit $a$ through the rectifier in the forward direction to energize the neon discharge lamp 72 thereby to indicate the presence of a product being out of standard. On such completion of the circuit $a$ the voltage drop across the resistance 81 is increased because the current flowing through the lamp 72 and the current flowing through the lamp 73 are in the same phase. The increase of the voltage drop across the resistor 81 decreases the discharge sustaining voltage for the lamp 73 so as to make the latter undischargeable thereby to put out the latter. Such operation remains unchanged irrespective of the change in number of the unit circuits A connected in parallel relation. The resistor 81 constitutes a stabilizing resistance for the neon lamps.

While particular embodiments of the invention have been shown and described herein, it will be evident to those skilled in the art that these are not intended to be exhaustive nor limiting of the invention, but, on the contrary, are given for purposes of illustration in order that others skilled in the art may fully understand the invention and the principles thereof and the manner of applying it in various forms and that the invention is designed or comprehended within the appended claims which should be given a scope consistent with the prior art.

What is claimed is:

1. An indicating system for inspecting a dimension of a product, comprising a transformer including primary and secondary windings, said secondary winding of the transformer having two extremities and including a center tap, a resistor coupled to one extremity of said secondary winding, a first lamp connected to said center tap, a switch including a movable contact coupled to the other extremity of said secondary winding and two stationary contacts operatively disposed with respect to said movable contact, a second lamp connected to one of said stationary contacts, a third lamp connected to the other of said stationary contacts and a dimension measuring means coupled to and adapted to actuate said movable contact to engage one of the stationary contacts when the dimension measured is less than a predetermined lower limit and to engage the other of the stationary contacts when the dimension measured is more than a predetermined upper limit.

2. An indicating system for inspecting a dimension of a product, comprising a transformer including primary and secondary windings, said secondary winding of the transformer having two extremities and including a center tap, a resistor coupled to one extremitiy of said secondary winding, a first lamp connected to said center tap, a rectifier connected between said lamp and resistor, a switch including a movable contact coupled to the other extremity of said secondary winding and two stationary contacts operatively disposed with respect to said movable contact, a second lamp connected to one of said stationary contacts, a second rectifier connected between said first and second lamps, said rectifier being polarized in the same direction, a third lamp connected to the other of said stationary contacts and a dimension measuring means coupled to and adapted to actuate said movable contact to engage one of the stationary contacts when the dimension measured is less than a predetermined lower limit and to engage the other of the stationary contacts when the dimension measured is more than a predetermined upper limit.

3. An indicating system for an overall inspection of the dimensions of a product, comprising first and second power supply lines, first and second conducting lines, unit indicating circuits and an overall indicating circuit operatively connected with the unit indicating circuits through the supply lines and conducting lines, each of said unit indicating circuits comprising a transformer including primary and secondary windings, said secondary winding of the transformer having two extremities and including a center tap, a resistor coupled to one extremity of said secondary winding, a first lamp connected to said center tap, a rectifier connected between said lamp and resistor, a switch including a movable contact coupled to the other extremity of said secondary winding and two stationary contacts operatively disposed with respect to said movable contact, a second lamp connected to one of said stationary contacts, a second rectifier connected between said first and second lamps, said rectifier being polarized in the same direction, a third lamp connected to the other of said stationary contacts and a dimension measuring means coupled to and adapted to actuate said movable contact to engage one of the stationary contacts when the dimension measured is less than a predetermined lower limit and to engage the other of the stationary contacts when the dimension measured is more than a predetermined upper limit; the overall indicating circuit comprising a second transformer including primary and secondary windings, the primary winding of which is connected to the power supply lines, a further resistor connected to the secondary winding of said second transformer and to said first conducting line, an electromagnet relay and a condenser in parallel and coupled to the latter said secondary winding, a rectifier coupled to the relay and condenser and to the second conducting line; the secondary winding of said first transformer being connected to said first conducting line, the rectifiers in the unit indicating circuit and the rectifier in the overall indicating line being directed in the same direction with respect to the second conducting line.

4. An indicating system for an overall inspection of the dimensions of a product, comprising first and second power supply lines, first and second conducting lines, unit indicating circuits and an overall indicating circuit operatively connected with the unit indicating circuits through the supply lines and conducting lines, each of said unit indicating circuits comprising a transformer including primary and secondary windings, said secondary winding of the transformer having two extremities and including a center tap, a resistor coupled to one extremity of said secondary winding, a first lamp connected to said center tap, a rectifier connected between said lamp and resistor, a switch including a movable contact coupled to the other extremity of said secondary winding and two stationary contacts operatively disposed with respect to said movable contact, a second lamp connected to one of said stationary contacts, a second rectifier connected between said first and second lamps, said rectifier being polarized in the same direction, a third lamp connected to the other of said stationary contacts and a dimension measuring means coupled to and adapted to actuate said movable contact to engage one of the stationary contacts when the dimension measured is less than a predetermined lower limit and to engage the other of the stationary contacts when the dimension measured is more than a predetermined upper limit; the overall indicating circuit comprising a first line including in series two resistors the ends of which are respectively connected to the power supply lines, a second line including a neon tube the ends of which are connected respectively to the second power supply line and second conducting line, a third line including another neon tube the ends of which are respectively connected to the first line between the two resistors and the first conducting line, and a fourth line including in series a resistor and rectifier the ends of which are respectively connected to the first power supply line and the first conducting line, the secondary winding of said transformer being connected to the first conducting line, and a further resistor, said two rectifiers being connected to the second conducting line through said further resistor.

5. An indicating system for an overall inspection of the dimensions, of a product, comprising first and second power supply lines, first and second conducting lines, unit indicating circuits and an overall indicating circuit operatively connected with the unit indicating circuits through the supply lines and conducting lines, each of said unit indicating circuits comprising a transformer including primary and secondary windings, said secondary winding of the transformer having two extremities and including a center tap, a resistor coupled to one extremity of said secondary winding, a first lamp connected to said center tap, a rectifier connected between said lamp and resistor, a switch including a movable contact coupled to the other extremity of said secondary winding and two stationary contacts operatively disposed with respect to said movable contact, a second lamp connected to one of said stationary contacts, a second rectifier connected between said first and second lamps, said rectifier being polarized in the same direction, a third lamp connected to the other of said stationary contacts and a dimension measuring means coupled to and adapted to actuate said movable contact to engage one of the stationary contacts when the dimension measured is less than a predetermined lower limit and to engage the other of the stationary contacts when the dimension measured is more than a predetermined upper limit; the overall indicating circuit comprising a first line including in series a resistor, a condenser and an electromagnet relay in parallel and a discharge tube including a cathode, anode and a starting electrode, the first line bing connected to the first power supply line, a further resistor, the cathode being connected to the second power supply line and to the first conducting line through said further resistor, two further resistors, a second line connecting the first power supply line and the starting electrode of the discharge tube through said two further resistors, and a third line connected to the second line between the two resistors therein and connected to the second conducting line, said secondary winding being connected to the first conducting line, and a resistor connecting the said two resistors to the second conducting line.

References Cited in the file of this patent

UNITED STATES PATENTS 2,767,351     Gieseke                Oct. 16, 1956